United States Patent
Garfield

(10) Patent No.: US 8,214,287 B1
(45) Date of Patent: Jul. 3, 2012

(54) SYSTEM FOR COLLECTING AND DISTRIBUTING CHARITABLE CONTRIBUTIONS

(76) Inventor: Ernest Garfield, Scottsdale, AZ (US)

( * ) Notice: Subject to any disclaimer, the term of this patent is extended or adjusted under 35 U.S.C. 154(b) by 641 days.

(21) Appl. No.: 12/316,363

(22) Filed: Dec. 11, 2008

Related U.S. Application Data

(60) Provisional application No. 61/007,356, filed on Dec. 12, 2007.

(51) Int. Cl.
*G06Q 40/00* (2006.01)

(52) U.S. Cl. .................................. 705/39; 705/35

(58) Field of Classification Search ............. 705/39, 705/35
See application file for complete search history.

(56) References Cited

U.S. PATENT DOCUMENTS

| | | | |
|---|---|---|---|
| 5,466,919 A | 11/1995 | Hovakimian | |
| 5,546,303 A | 8/1996 | Helbling | |
| 5,555,497 A | 9/1996 | Helbling | |
| 7,715,368 B1 * | 5/2010 | Croak et al. | 370/352 |
| 7,756,764 B1 * | 7/2010 | Horne et al. | 705/35 |
| 2002/0008146 A1 | 1/2002 | Singhal | |
| 2003/0167177 A1 | 9/2003 | Branch | |
| 2006/0235713 A1 * | 10/2006 | Tobler et al. | 705/1 |
| 2007/0033134 A1 * | 2/2007 | Carretta et al. | 705/38 |
| 2008/0126269 A1 * | 5/2008 | Malackowski et al. | 705/36 R |
| 2008/0313077 A1 * | 12/2008 | Schropfer | 705/39 |
| 2009/0012904 A1 * | 1/2009 | McCord | 705/80 |
| 2009/0063332 A1 * | 3/2009 | Tabaczynski et al. | 705/39 |

* cited by examiner

*Primary Examiner* — Jagdish Patel
*Assistant Examiner* — Kevin Poe
(74) *Attorney, Agent, or Firm* — Paul B. Heynssens, Attorney at Law, PLC

(57) ABSTRACT

An Internet-based system to market financial and banking services to both participating and registered individuals and business customers. A portion of the transaction fees that are associated with various products and services provided by financial institutions such as checking and savings accounts, loans, trust services and escrow services are converted into charitable contributions which are processed by the system clearing house and then are forwarded to one or more charitable organizations designated by the participating individual or business. "Finders" fees for savings accounts and certificates of deposit will also be converted into charitable contributions.

12 Claims, 2 Drawing Sheets

TYPICAL TRANSACTIONS WHICH GENERATE A DONATION

1. Certificate of Deposit
2. Opening a New Checking or Savings Account
3. Personal Loans
4. Mortgage Loans
5. Title Company fees
6. Account Maintenance and Service Fees
7. Escrow Services
8. Trust Services

FIGURE 2

SYSTEM FOR COLLECTING AND DISTRIBUTING CHARITABLE CONTRIBUTIONS

CROSS-REFERENCE IS MADE TO RELATED APPLICATION

This application is based on U.S. Provisional Patent Application Ser. No. 61/007,356, filed Dec. 12, 2007, of the same title.

FIELD OF THE INVENTION

The present invention relates to a system for collecting and distributing charitable contributions and more particularly relates to a system in which a portion of qualifying transaction fees and other qualifying financial institution charges are transferred as contributions to beneficiary charitable organizations designated by the individual participant from a list of such organizations.

BACKGROUND OF THE INVENTION

The financial services industry is exceedingly competitive. Banks, savings and loan institutions, trust companies, title companies, credit card companies and others are continually seeking ways to attract and maintain customers and to effectively market various financial services.

Conventionally these types of institutions utilize various tools and incentives for this purpose. These incentives may be in the form of rewards credited to the customer based on usage of services and purchases which may be redeemed for goods and services. Banks and other financial institutions often will offer a menu of free or reduced costs services to customers and will use free gifts as incentives to attract and maintain customers.

It is estimated there are approximately 1.8 million non-profit organizations in the U.S. including religious organizations. Generally, these non-profit organizations must rely on charitable contributions and various fund-raising activities in order to support their activities. Most individuals have one or more charitable organization, religious organization or cause which they support and to which they occasionally or regularly donate. Donations are made to financially support the activities of the selected organization and also because of inherent personal satisfaction individuals obtain from supporting a cause the individual believes is worthwhile.

There are various prior art programs for directing donations to a charity when purchases are made at participating merchants. U.S. Publication No. 2002/0008146 describes a universal charity card system which identifies a customer-benefactor and a charity by coded information. A merchant computer system reads the universal charity card's coded information and computes a charitable contribution as a percent of sales to the customer benefactor and stores the information in a merchant database. A central computer system pre-stores the merchant's bank electronic funds transfer identification, charity bank electronic funds identification and links to the merchant computer for the purpose of downloading the merchant database and initiates a debit electronic fund transfer to the merchant's bank or an amount equal to the charitable contribution and a credit electronic fund transfer to the charity's bank or an amount equal to the charitable contribution.

U.S. Pat. Nos. 5,555,497 and 5,546,303 both relate to vending machine systems in which a multiplicity of charitable collection stages are provided with selections for choosing the charity to which the contribution is to be made. The central station communicates with the individual charitable institutions to provide information as to monies collected and signals the machines as to premiums available to the donor.

U.S. Pat. No. 5,466,919 describes a system which enables a credit card cardholder to make a donation to a cardholder's selected charity at any time the cardholder makes a purchase using the credit card. The method comprises a credit/charge card which identifies on its magnetic strip charities to receive a donation in a bank expedited system which processes the card user's purchase transaction, pay a previously decided amount to the charity or charities and also bills the cardholder. In this system, the donated amounts may be paid by the bank or card issuing organization when the cardholder may add an amount which he/she pays to a selected charity. The system is described as a bank expedited charity donation.

U.S. Publication No. 2003/0167177 relates to an incentive-based loyalty program in which portions of sales receipts are credited to a designated charity. The system includes the steps of enrolling at least one member; receiving a designation of at least one charitable organization from the member, the member being unrestricted as to which charitable organization is designated. A portion of the proceeds from a financial transaction are credited to a designated charitable organization.

While there are various systems such as those described above and other systems for expediting and facilitating donations to charitable organizations, there nevertheless exists the need for a system which will (1) provide necessary funding to charitable organizations; (2) provide a simple and convenient means for an individual to direct funds to a selected charity or charities without any additional costs to the individual and (3) provide marketing benefits to participating financial institutions.

BRIEF SUMMARY OF THE INVENTION

Briefly, the present invention provides an Internet-based system which markets financial and banking services and concurrently benefit the fund-raising activities of charitable and public service organizations.

Under the present system, which is designated the Outreach Way Program, a portion of the transaction fees and other fees that a financial institution charges are converted into contributions which are forwarded to the system clearing house for processing and then, in turn, are forwarded to one or more charitable organizations designated by the individual.

The individual will initially register as a member or participant with the Outreach Way Program. The system will be explained with reference to use by an individual, it being understood that the system of the present invention may be utilized by business and corporate customers as well. Registration can be accomplished in a conventional manner by completing the necessary forms or, preferably, is done online. The member will provide the necessary information concerning the member's name, address and other contact information. As part of the registration process, the member will be assigned a unique identifier such as a PIN (personal identification number). The member may also be provided a card with encoded data. The registrant member will then be able to select from a menu of qualifying charities and public service organizations that the member wishes to designate as recipients of donation funds generated through the system. This can be done online and the designees may be changed by the member. Preferably the number of designated recipient organizations the individual member may select will be limited to a number such as three. The member will also register or enter the names of banks and financial institutions that are members of the program with which the new member has a present affiliation or an institution with whom the member intends to utilize for future financial transactions. The charitable designees and the financial institutions selected or designated will be maintained in the database records of the Outreach Way Program's online clearing house.

The member may also sign up at participating financial institutions or at participating charitable public service organizations. When one of the members opens an account or maintains or engages in a qualifying financial transaction with a participating financial organization, the member-selected charities will receive a percentage of fees charged or a scheduled amount for a particular transaction. For example, if a new member designates the First Bank as one of the member's designated banks and has also designated a particular church, First Church, and a particular organization such as a medical research foundation, First Medical Research, as the selected beneficiaries, a designated amount will be sent to each of these organizations when the member engages in a personal or business bank account or other banking relationship with the financial institution. The amount may be a percent of the fees charged by financial institution, such as fees charged in connection with loan origination or may be a scheduled fee, for example, a fixed fee upon establishing or opening a new bank account or obtaining a credit card.

BRIEF DESCRIPTION OF THE DRAWINGS

The above and other advantages and objects of the present invention will become more apparent from the following description, claims and drawing in which:

FIG. 2 is a list of representative transactions which will result in the generation of a donation under they system.

DETAILED DESCRIPTION OF THE DRAWINGS

Figure 1:
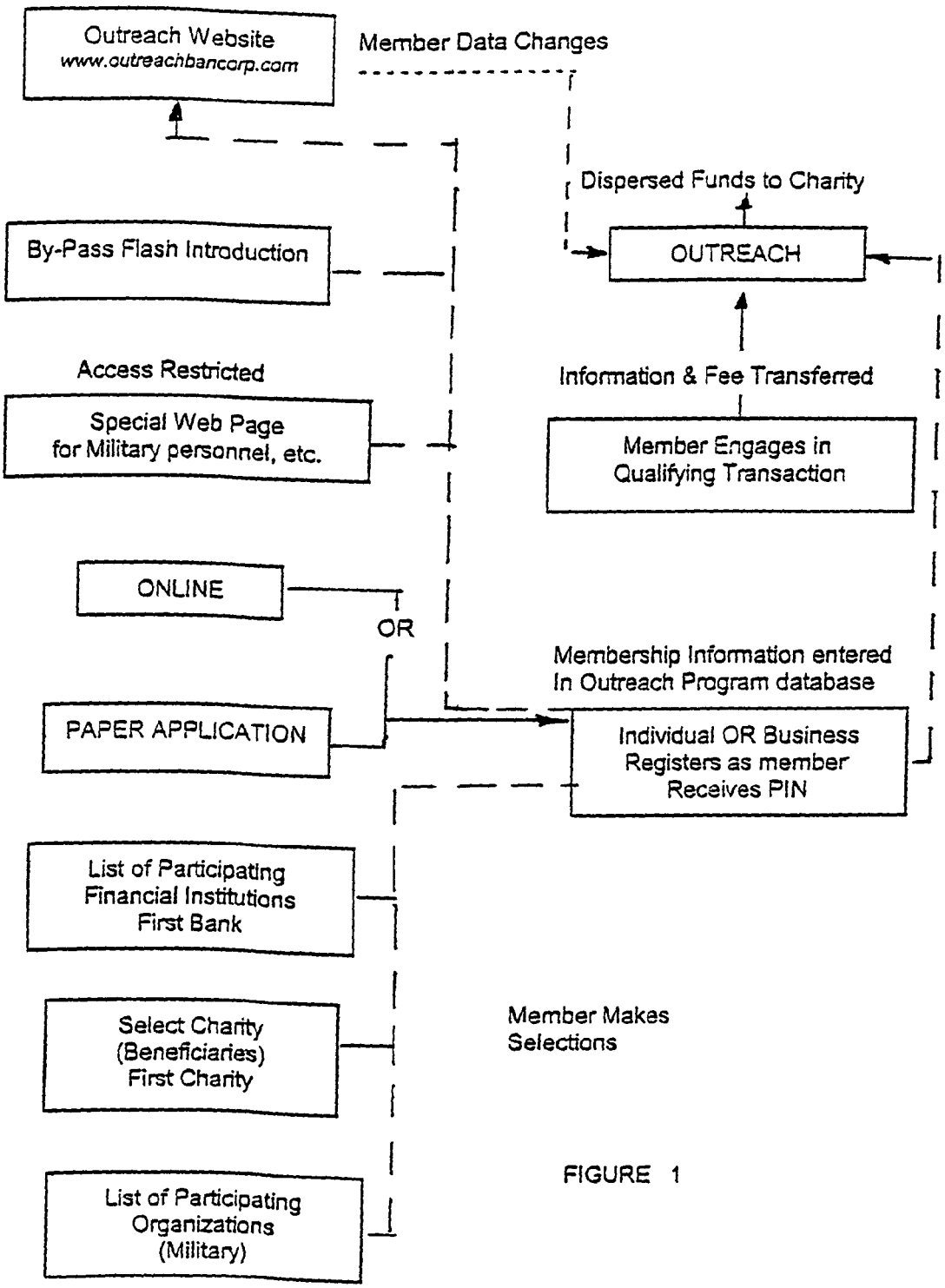
FIG. 1 is a schematic diagram illustrating the system of the present invention.

Throughout this description, the individual member is referred to as a member, participant or donor.

The terms "charitable organization" or "benefactor" are used broadly to identify charitable organizations that are qualified under Section 503(c)(1) of the Internal Revenue Code, and includes organizations such as schools, churches, medical research groups and other public service organizations.

An individual who wishes to participate in the system by directing funds to a charitable organization must first register. The individual may visit a participating charitable organization and register through the fund-raising coordinator of the organization. This can be done online or by completing the necessary paper forms or the coordinator may assist the individual to register online to become a member.

A prospective new member can also register with a participating financial institution, such as a bank, by accessing and utilizing the financial institution's website or by contacting a financial institution representative. Most participating financial institutions will have a web page dedicated to the program and which can be utilized for new registrations.

When utilizing online registration, the registering new member may also access the program website such as www.outreachbancorp.com. The individual will be presented with an initial flash screen presentation which presents information concerning the program. The individual may bypass the flash screen presentation if desired. The registration process will present the prospective new member with a template which will require the individual to provide basic information such as the individual's name, address, contact information and the like. Once the new member has provided this basic information, the registration is complete. The user will then be given a user name and password which the member may select or which may be designated and provided to the new member either at the time of registration, or by a separate email or other communication for purposes of security. This will allow the member to access the member account information showing transactions, donations, designated charitable beneficiaries and selected financial institutions. A member may also be provided a membership card with the member's name and Outreach Way Program logo and other information. The card may also be suitably encoded with the member's user name, PIN (personal identification number) which the member may present to a financial institution when utilizing the system. The card may be swiped or information entered manually or by a no-swipe reader to verify the member and access the Outreach Way Program clearing house when the member engages in a transaction.

The new member will then be required to select one or more financial institutions with which the member has either present affiliation or with which the member intends to establish relationship in the future. In this case, the member has designated First Bank as such as financial institution.

The next step in the registration process is for the member to select one or more beneficiary organizations from a list of registered organizations to which funds are to be directed. As pointed out above, the organizations may be charitable organizations or religious organizations, schools or other types of public service organizations. The new member can scroll through a list of organizations and select one or more with the member selection number being limited to a number such as three. In FIG. 1, the new member has designated the beneficiary as First Charity. The member may, at any time, go online to www.outreachbancorp.com and access his or her account using the user name and password and add, delete or change the designations.

The present system benefits financial institutions in that, as a participating financial institution or other organization, the Outreach Way Program will attract new customers to the financial institution. Individuals who wish to direct funds to their favorite charities will select financial relationships with organizations participating in the system. The financial institution should be in compliance with the Community Reinvestment Act and may also be entitled to a tax benefit for the charitable deduction or, at least, will be able to write off the expense of participating as a cost of doing business.

Similarly, it will be necessary for charitable organizations to register to become participants in the system. The organization may be a corporation, a trust, or an unincorporated association that is a qualified organization under IRC §501 (c)(3). The benefits to the charitable organization are potentially increased revenue at essentially no cost, as well as marketing exposure.

The benefit to the participating member is that the individual's activities will result in donations being directed to the organizations of the donor's choice at no cost to the individual since the donations are made by financial institutions based on the participating individual's activities. The benefits to participating financial institutions are a potential increase in customers and businesses at little cost as well as the positive recognition that accompanies community participation.

As seen in FIG. 1, the Outreach Way Program website will also have a special page or section for military, police and first responder appreciation. Qualifying members such as active members of the U.S. military and others such as active law enforcement and firefighters may access the special section for this group and will complete the same basic registration process as described above. However, the password and user name of these members will allow access to this section of the Outreach Way Program website. The list of participating organizations in this section includes, not only the charitable religious and public service organizations, as previously mentioned, but will also include a category of organizations that provide special assistance to members and families of the military, members and families of law enforcement agencies and members and family of first responders.

Once an individual has registered with the Outreach Way Program system and designated selected financial institutions as well as charitable organizations, the member then can proceed to utilize the services of one of the financial institutions. For example, if the user has designated the First Bank as one of the designated financial institutions, the user can then complete a transaction with First Bank such as opening a business or personal savings account or by opening a personal or business certificates of deposit, taking out a loan, obtaining a credit card or some other activity. The member will, at the time of the transaction, identify him- or herself as a member of the Outreach Way Program system providing the financial institution with the necessary information such as the member's name and other information. The member may present the member's card to access the Outreach Way Program system.

Upon completing the transaction, the financial institution will enter information concerning the transaction and the identification of the member to Outreach Way Program which is, essentially, a clearing house. Outreach Way Program will receive the information along with the amount of the donation transferred by the financial institution to Outreach. For example, the donation amount may be a set amount or a percent of the transaction. The Outreach Way Program system, as described above, maintains a list of current beneficiary organizations selected by the member. Outreach Way Program system will then process the transaction, forwarding the appropriate amounts to the beneficiary charitable organizations. The Outreach Way Program system may charge a small service fee for the administration of the system. In some cases, the fee may be a one time fee such as a fee based on a loan. In other cases, the fee may be ongoing such as, for instance, where the member opens a bank account and service charges are assessed by the financial institution periodically. In such cases, a percentage of the periodic fees are an amount based on the periodic fees that would be forwarded at intervals by the financial institution to Outreach Way Program system. If the donated sums are relatively small, Outreach Way Program system may accumulate these amounts until they reach a certain threshold amount and, at that time, forward the donations to the appropriate charitable organizations.

Qualifying transactions which result in a donation may include, but are not limited to those listed on FIG. 2.

It will be seen that the foregoing system provides a highly beneficial platform which will attract and maintain customers for financial institutions, while, at the same time, qualified charities and public service organizations will receive additional fund-raising based on the charges for banking and financial services. The member, charitable organizations and financial institutions can participate simply by registering with the program. The charitable organization will benefit when a member uses the services of participating financial institutions and the donations are directed by the member and are at no cost to the member.

The system may be utilized both by individuals as well as business and corporate users. The system rewards users for savings as well as spending focusing on rewards from financial institutions when a customer utilizes products and services selected from the wide range of product and services available from such institutions.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A computer implemented method of promoting enrolment in a service of financial institutions and distributing charitable contributions through a clearing house so that at a later time when a member enrolls in a service of a financial institution, known to the clearing house, a charitable contribution is made comprising:
   (a) registering at least one member online with the clearing house, by utilizing a computer generated web page, to create an enrolled member;
   (b) receiving at the clearing house a designation of at least one charitable organization from the enrolled member through an internet connection;
   (c) previously registering with the clearing house at least one financial institution which provides a qualified financial service;
   (d) designating by the member, through a web based interface with the clearing house the at least one financial institution with whom the member intends to establish a relationship with in the future; and
   (e) crediting an amount to the at least one charitable organization through the clearing house at a future time the member enrolls in the qualified financial service offered by the designated financial institution in which enrolment has been designated as eligible for making a charitable contribution and whereby the previously designated financial institution was previously registered with the clearing house.

2. The method of promoting financial institutions of claim 1 wherein the method is implemented on a server connected to a network accessible by the member.

3. The method of promoting financial institutions of claim 1 wherein the member may change the designation of financial institutions.

4. The method of promoting financial institutions of claim 1 wherein the member is assigned a unique identifier.

5. The method of promoting financial institutions of claim 2 wherein the member can track the transactions and credits on an account website on said server.

6. The method of promoting financial institutions of claim 5 wherein the member account is password protected.

7. The method of promoting financial institutions of claim 2 wherein said server provides a website.

8. The method of promoting financial institutions of claim 7 wherein said website includes restricted sections accessible only by certain members.

9. The method of promoting financial institutions of claim 8 wherein said certain members are selected from the group consisting of military, law enforcement, firefighters and first responders.

10. The method of promoting financial institutions of claim 1 wherein said charitable organizations are qualified under §501(c)(3) of the Internal Revenue Code.

11. The method of promoting financial institutions of claim 7 wherein the member may register online via online.

12. The method of promoting financial institutions of claim 1 wherein the amounts are accumulated on the server and transferred when a predetermined aggregate amount is reached.

* * * * *